(12) United States Patent
Klingbeil

(10) Patent No.: US 9,249,744 B2
(45) Date of Patent: Feb. 2, 2016

(54) METHOD FOR OPERATING AN ENGINE

(75) Inventor: Adam Edgar Klingbeil, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 917 days.

(21) Appl. No.: 13/484,621

(22) Filed: May 31, 2012

(65) Prior Publication Data

US 2013/0325295 A1    Dec. 5, 2013

(51) Int. Cl.

| | |
|---|---|
| *F02D 41/30* | (2006.01) |
| *F02D 41/00* | (2006.01) |
| *F02D 19/06* | (2006.01) |
| *F02D 19/10* | (2006.01) |

(52) U.S. Cl.
CPC .......... *F02D 41/0025* (2013.01); *F02D 19/061* (2013.01); *F02D 19/10* (2013.01); *F02D 41/0027* (2013.01); *F02D 19/0689* (2013.01); *F02D 19/0692* (2013.01); *Y02T 10/36* (2013.01)

(58) Field of Classification Search
CPC ... Y02T 10/36; F02D 19/0692; F02D 19/061; F02D 19/0689; F02D 41/0027; F02D 41/0025; F02D 19/10
USPC .......................................................... 701/104
See application file for complete search history.

(56) References Cited

U.S. PATENT DOCUMENTS

| | | | | |
|---|---|---|---|---|
| 5,713,328 A | * | 2/1998 | Anderson | ............... F02D 33/00 123/299 |
| 5,875,743 A | * | 3/1999 | Dickey | ...................... F02B 1/12 123/25 C |
| 5,890,459 A | * | 4/1999 | Hedrick | ................... F02B 69/02 123/27 GE |
| 6,101,986 A | | 8/2000 | Brown et al. | |
| 6,276,334 B1 | * | 8/2001 | Flynn | ...................... F02B 19/14 123/435 |
| 6,907,870 B2 | | 6/2005 | Zur Loye et al. | |
| 6,912,992 B2 | | 7/2005 | Ancimer et al. | |
| 6,951,202 B2 | | 10/2005 | Oda | |
| 7,387,091 B2 | | 6/2008 | Ritter | |
| 7,533,634 B2 | | 5/2009 | Ritter et al. | |
| 7,740,000 B2 | * | 6/2010 | He | ........................ F02D 35/023 123/299 |
| 8,037,850 B2 | | 10/2011 | Pursifull | |
| 2002/0007816 A1 | * | 1/2002 | Zur Loye | .................. F02B 1/12 123/295 |

(Continued)

FOREIGN PATENT DOCUMENTS

| | | |
|---|---|---|
| JP | 2004108153 A | 4/2004 |
| WO | 2011128692 A1 | 10/2011 |
| WO | 2011153069 A1 | 12/2011 |

OTHER PUBLICATIONS

Search Report and Written Opinion issued in connection with corresponding GB Application No. GB1309361.2 dated Nov. 25, 2013.

(Continued)

*Primary Examiner* — Hieu T Vo
*Assistant Examiner* — Arnold Castro
(74) *Attorney, Agent, or Firm* — Joseph J. Christian

(57) ABSTRACT

A method for operating an engine comprises introducing a first fuel, a second fuel and an oxidant into a first engine cylinder and a second engine cylinder; monitoring a plurality of engine parameters; and adjusting a quantity of one of the first fuel, the second fuel, and the oxidant introduced to the first engine cylinder to be different from a quantity of one of the first fuel, the second fuel, and the oxidant introduced to the second engine cylinder based at least one of the plurality of monitored engine parameters.

29 Claims, 2 Drawing Sheets

(56) References Cited

U.S. PATENT DOCUMENTS

| | | | |
|---|---|---|---|
| 2003/0221661 A1* | 12/2003 | Willi | F02D 35/023 123/299 |
| 2006/0032477 A1 | 2/2006 | May | |
| 2008/0053399 A1* | 3/2008 | Bromberg | F02D 19/081 123/304 |
| 2009/0025695 A1* | 1/2009 | Wolber | F02D 41/0025 123/527 |
| 2009/0271090 A1* | 10/2009 | Surnilla | F02D 19/0628 701/103 |
| 2009/0292444 A1* | 11/2009 | Russell | F02D 35/027 701/103 |
| 2011/0088654 A1* | 4/2011 | Courtoy | F02D 19/0647 123/299 |
| 2011/0132323 A1 | 6/2011 | Surnilla et al. | |
| 2011/0184629 A1* | 7/2011 | Krengel | F02D 19/061 701/103 |
| 2011/0288744 A1* | 11/2011 | Gokhale | F02D 35/02 701/102 |
| 2011/0288751 A1* | 11/2011 | Kurtz | F02D 41/0025 701/109 |
| 2012/0109496 A1* | 5/2012 | Hylands | F02D 19/0631 701/103 |
| 2012/0145122 A1* | 6/2012 | Kurtz | F02D 41/0025 123/299 |
| 2012/0158269 A1* | 6/2012 | Nakayama | F01N 11/00 701/103 |
| 2012/0272935 A1* | 11/2012 | Magnusson | F02D 19/081 123/299 |
| 2012/0325180 A1* | 12/2012 | Montgomery | F02D 41/403 123/299 |
| 2012/0325350 A1* | 12/2012 | Kim | F02D 19/0694 137/596 |
| 2013/0025573 A1* | 1/2013 | Klingbeil | F02D 19/0642 123/525 |
| 2013/0325295 A1* | 12/2013 | Klingbeil | F02D 19/061 701/104 |
| 2014/0069384 A1* | 3/2014 | Suzuki | F02D 41/403 123/445 |

OTHER PUBLICATIONS

Qian et al., "Research of the Influence of Combustion Chamber Structure on Performance of Dual Fuel Engine", IEEE International Conference on Electric Information and Control, pp. 2498-2500, Apr. 15-17, 2011.

* cited by examiner

METHOD FOR OPERATING AN ENGINE

BACKGROUND OF THE DISCLOSURE

This invention relates generally to methods for operating an engine. More particularly, this invention relates to methods for introduction of a plurality of fuels into an internal combustion engine for operating such an engine.

Internal combustion engines have been widely used in many fields, such as vehicles due to high power-to-weight ratios together with high fuel energy density. In recent years, with increasing attention of reducing pollution of harmful engine emissions to environment, internal combustion engines, such as compression ignition engines (also known as "diesel" engines) can be modified to burn a plurality of fuels, such as both natural gas and diesel fuels, which is referred to as dual fuel operation.

During the dual fuel operation, the natural gas is premixed with an intake air, and then the mixture is introduced into engine cylinders during intake strokes thereof. Subsequently, compression strokes of the engine cylinders start and proceed to increase pressure and temperature of the mixture. At the end of the compression strokes, a small quantity of the diesel fuel is injected into the engine cylinders to ignite the mixture of the intake air and the natural gas by the auto-ignition of the diesel fuel so as to trigger combustion in the engine cylinders.

As a result, the substitution of the natural gas to the diesel fuel reduces the emissions of the pollutants, such as nitrogen oxides (NOx), and particulate matter (PM). However, when the operation of such engines is switched from a steady state to an increased load state, such as a transient acceleration state, the quantity of the natural gas is increased significantly to provide desirable power, which results in reduction of the air fuel ratio (AFR) and may cause the auto-ignition of the premixed natural gas accordingly. The auto-ignition of the premixed natural gas may cause detonation or knocking in the engine cylinders, thereby damaging the engine.

There have been attempts to avoid the detonation or knocking in the engine cylinders. For example, to enable the dual fuel operation, the compression ratio of the engine cylinders may be reduced. This may result in reduction of the cycle efficiency of the engines and increased challenges during cold start. Alternatively, during the dual fuel operation, the substitution of the natural gas to the diesel fuel may be reduced, which increases the harmful engine emissions and the fuel cost due to the increased quantity of the diesel fuel.

Therefore, there is a need for new and improved methods for operating an internal combustion engine in an increased load state thereof while having a high ratio of a gaseous fuel, such as natural gas to a liquid fuel, such as diesel.

BRIEF DESCRIPTION OF THE DISCLOSURE

A method for operating an engine is provided in accordance with one embodiment of the invention. The method comprises introducing a first fuel, a second fuel and an oxidant into a first engine cylinder and a second engine cylinder; monitoring a plurality of engine parameters; and adjusting a quantity of one of the first fuel, the second fuel, and the oxidant introduced to the first engine cylinder to be different from a quantity of one of the first fuel, the second fuel, and the oxidant introduced to the second engine cylinder based at least one of the plurality of monitored engine parameters.

A method for operating an engine is provided in accordance with another embodiment of the invention. The method comprises introducing a first fuel, a second fuel and an oxidant into a first engine cylinder to operate the engine; monitoring a plurality of engine parameters; and increasing a quantity of the second fuel introduced in the first engine cylinder based on one of the plurality of monitored engine parameters; and reducing a quantity of the first fuel introduced in the first engine cylinder based on one of the plurality of monitored engine parameters in response to an increased load operation of the engine.

A method for operating an engine is provided in accordance with yet another embodiment of the invention. The method comprises introducing a first fuel, a second fuel and an oxidant into first and second engine cylinders; monitoring a plurality of engine parameters; increasing a quantity of the second fuel and reducing a quantity of the first fuel in the first engine cylinder in response to an increased load operation of the engine; and adjusting a quantity of one of the first fuel, the second fuel and the oxidant introduced to the second engine cylinder to be different from a quantity of one of the first fuel, the second fuel, and the oxidant introduced to the first engine cylinder.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION OF THE INVENTION

Preferred embodiments of the present disclosure will be described hereinbelow with reference to the accompanying drawings. In the following description, well-known functions or constructions are not described in detail to avoid obscuring the disclosure in unnecessary detail.

In embodiments of the invention, a method for operating an engine is provided. The engine may comprise an internal combustion engine or other types of engines. Typically, the method employs a plurality of fuels to operate the engine. In one non-limiting example, the method is provided to operate the engine to switch from a steady state to an increased load state. As used herein, in some applications, the term "steady state" may indicate engine load or engine speed is substantially stable.

The fuels at least comprise a first fuel and a second fuel. The first and second fuels comprise a non-compression-combustible fuel and a compression-combustible fuel, respectively. As used herein, the term "non-compression-combustible fuel" means any single material or combination of materials that will not spontaneously ignite or combust under typical operating conditions, but will ignite or burn with the aid of an ignition spark or flame in a reciprocating engine cylinder.

It is known to one skilled in the art that most fuels will be compression-combustible at sufficiently high temperatures, but the non-compression-combustible fuels referred to here are fuels that are intended to ignite via flame propagation only and that auto-ignition or compression-combustion be avoided. Non-limiting examples of such fuels include natural gas, ethanol or gasoline.

The term "compression-combustible fuel" means any single material or combination of materials that are intended to spontaneously ignite or combust, without the aid of an ignition spark or existing flame, in a reciprocating engine cylinder during and/or immediately after a compression stroke of a piston therein. Non-limiting examples of the compression-combustible fuels include diesel, kerosene and heavy fuel oil.

During the increased load state of the engine, the quantity of the first fuel may be reduced and the quantity of the second fuel is increased for introduction into a cylinder of the engine, as compared to operation in the steady state thereof, such that the total fuels into the engine is increased. In some examples, the quantity of the first fuel is decreased to be in a range of from about 70% to about 50% and the quantity of the second fuel is increased to be in a range of from 30% to about 50%.

Figure 1:
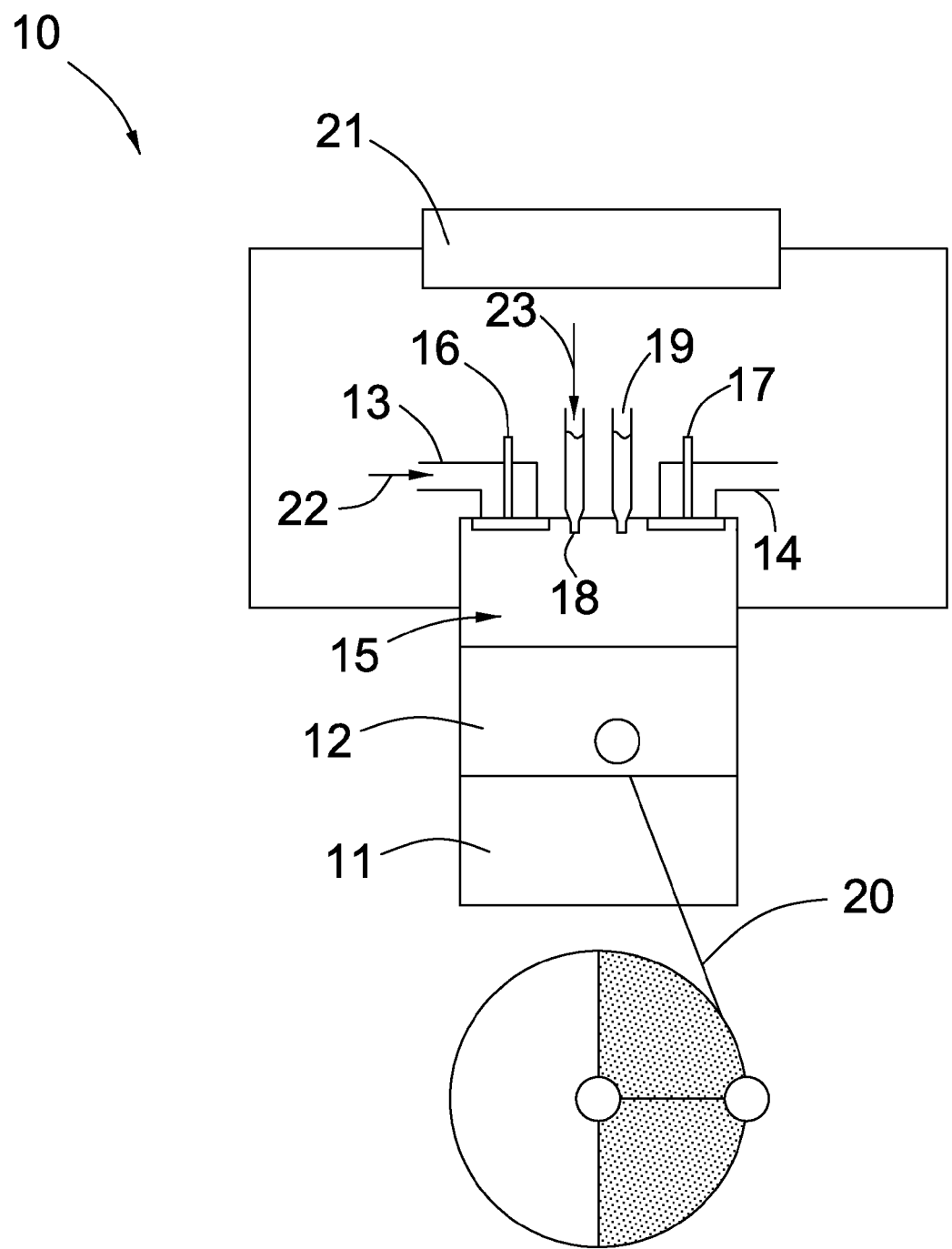
FIG. 1 is a schematic diagram of an engine cylinder of an engine in accordance with one embodiment of the invention.

FIG. 1 illustrates a schematic diagram of a cylinder 11 of an engine 10 in accordance with one embodiment of the invention. Although a single cylinder 11 of the engine 10 is illustrated, the engine 10 may comprise more than one cylinder, for example four, six, eight, or twelve cylinders cooperating to provide suitable power based on different applications. For ease of illustration, other elements, such as sensors and sealing elements are not illustrated in FIG. 1.

As illustrated in FIG. 1, the engine 10 comprises the cylinder 11 having a piston 12 movably located therein. An intake manifold 13 and an exhaust manifold 14 are in fluid communication with a combustion chamber 15 defined within the cylinder 11, respectively. The intake manifold 13 is configured to provide an input pathway (not labeled) for introduction of an oxidant and a first fuel into the combustion chamber 15. The exhaust manifold 14 is configured to provide an output pathway (not labeled) for all products of a combustion event that takes place in the combustion chamber 15.

A plurality of valves, such as an intake valve 16 and an exhaust valve 17 are configured to actuate at certain times and for certain durations to open and close fluid pathways (not labeled) between the combustion chamber 15 and the respective intake manifold 13 and the exhaust manifold 14. Additionally, one or more injectors, such as first and second injectors 18, 19 are also in fluid communication with the combustion chamber 15 so as to provide at least one fuel into the combustion chamber 15. It should be clear to one skilled in the art that any of the injectors may be in direct communication with the combustion chamber or may only be in fluid communication with the combustion chamber through a manifold such as the intake manifold or via a prechamber A connecting rod 20 is disposed between and connecting the piston 12 and a transmission mechanism, such as a crank shaft (not shown) so as to transmit the translational mechanical energy generated by the engine 10 into rotational energy for further use.

In addition, the engine further comprises a control unit 21 configured to control operation or status of the engine based on outputs from a plurality of sensors (not shown). The sensors are configured to monitor or detect a plurality of (measured or monitored) engine parameters including pressures, temperatures, flow rates, speed and power so that the control unit 21 determines and controls other parameters including, but not limited to fuel injection timings and quantities for all fuels being introduced accordingly.

Non-limiting examples of the plurality of sensors include fuel injection timing sensors, fuel flow sensors, throttle position sensors, manifold air pressure sensors, manifold air temperature sensors, exhaust gas temperature sensors, engine power sensors, knock sensors or the like. Thus, in non-limiting examples, the measured engine parameters may comprise at least one of engine speed, engine load, engine throttle position, intake manifold temperature, intake manifold pressure, exhaust gas flow rate and temperature, air flow into the cylinder, compression ratio, intake and exhaust valve timing.

Generally, during operation of a so-called four-stroke engine, each cylinder, such as the cylinder 11 of the engine 10 typically undergoes a four stroke cycle including an intake stroke, a compression stroke, an expansion stroke, and an exhaust stroke. As referred to FIG. 1, during the intake stroke, the exhaust valve 17 closes and the intake valve 16 opens. A mixture 22 is introduced into the combustion chamber 15 through the intake manifold 13 while the piston 12 moves towards a bottom of the cylinder 11 to increase the volume within the combustion chamber 15 until the piston 12 moves to a position where the combustion chamber 15 is at its largest volume, which is typically referred to as a bottom dead center (BDC) to complete the intake stroke. It will be apparent to one skilled in the art that this invention is not limited to a four-stroke engine and will work for other types of engines such as two-stroke engines and rotary engines, for example.

For the illustrated arrangement, the mixture 22 comprises the first fuel, such as the natural gas and at least one oxidant. In non-limiting examples, the at least one oxidant comprises air, pure oxygen, or either of which may be mixed with re-circulated exhaust gas. Prior to introduction of the mixture 22 into the combustion chamber 15, the at least one oxidant and the first fuel are premixed. In one non-limiting example, the premixing may take place in the intake manifold 13. Due to the employment of the control unit 21, the quantities and/or premixing of the first fuel and the at least one oxidant may be controlled based on the detected engine parameters.

As used herein, the term "premixed" means increasing the level, degree, and/or factor of homogeneity of two, or more, substances prior to an event. By example only, the air and the first fuel may be premixed to generate the premixed mixture 22 prior to the combustion event such that the level or degree homogeneity of the air and the first fuel has increased.

As used herein, the term "combustion event" means the activities occurring when a fuel(s)/air mixture is ignited and/or burned, partially or entirely, in a combustion chamber of an engine, thereby producing heat, carbon dioxide, steam, and other chemicals, regardless of whether the event was via spark ignition, compression ignition, or other suitable means.

Subsequently, during the compression stroke, the intake valve 16 and the exhaust valve 17 are closed. The piston 12 moves towards the cylinder head (not labeled) so as to compress the mixture 22 within the combustion chamber 15. The position at which the piston 12 is at the end of this stroke when the combustion chamber 15 is at its smallest volume is typically referred to as top dead center (TDC).

At the end of the compression stroke, in one non-limiting example, a certain quantity or amount of the second fuel 23 is controlled by the control unit 21 to be directly injected into the combustion chamber 15 via one or more of the injectors 18, 19. Alternatively, the second fuel 23 may be injected into the combustion chamber 15 before the piston 12 moves to the top dead center of the compression stroke.

In this compression stroke, because the mixture 22 is leaner than stoichiometric, the first fuel, such as the natural gas in the mixture 22 may not be prone to auto-ignition. Due to the compression-combustible property, the second fuel 23 may be prone to ignite upon injection into the combustion chamber 15, thereby igniting the mixture 22 of the air and the natural gas so as to trigger combustion accordingly.

As used herein, the term "lean" means a fuel(s)/oxidant(s) mixture having more oxidant(s) than the amount of oxidant(s) required at the stoichiometric point for the particular mixture. The term "stoichiometric" means a fuel(s)/oxidant(s) mixture having exactly enough oxidant(s) required to convert all of the fuel(s) to primary combustion products (e.g., $CO_2$ and $H_2O$ for hydrocarbon fuels).

Next, during the expansion stroke, due to the combustion, expanding gases generated during the combustion push the piston 12 back to BDC. The connecting rod 20 converts the movement of the piston 12 into the rotational energy for further use. Finally, during the exhaust stroke, the exhaust valve 17 opens to release the combusted air-fuel mixture through the exhaust manifold 14 and the piston 12 returns to TDC.

It should be noted that the above operation is merely illustrated as an example. In some examples, instead of injection of the second fuel 23 during the compression stroke, the mixture 22 and the second fuel 23 may be introduced into the combustion chamber 15 to mix together over time therein during the intake stroke prior to any combustion so that the degree of homogeneity of the mixture 22 and the second fuel 23 increases. Subsequent to the mixing, the second fuel 23 is combusted via compression of the piston 12 during the compression stroke.

During operation of the engine 10, the control unit 21 controls the engine operation based on the monitored engine parameters. Based on the monitoring of the parameters of the engine 10, when the engine is detected to operate, for example, in a steady state, the ratio of the first fuel, such as the natural gas to the second fuel, such as the diesel, is high and stable, and reduces the emissions of pollutants.

However, as mentioned above, in some current applications, when the engine operates to respond to a transient condition such as an increased load state (or operation) including the transient acceleration state, typically to switch from a steady state to a transient acceleration state, the quantity of the natural gas may be controlled to increase to a certain amount to provide desirable power. As a result, this causes reduction of the overall air to fuel ratio (AFR) and may cause the auto-ignition of the premixed natural gas during the compression stroke. The premixed natural gas burns volumetrically and may cause detonation or knocking issues in the engine.

Accordingly, in embodiments of the invention, compared to the operation in the steady state, when the engine operates in the increased load state, the quantity of the first fuel may be reduced and the quantity of the second fuel may be increased. Since the second fuel ignites upon injection and thus may not burn volumetrically so that the detonation or knocking issues may be avoided or eliminated.

For some arrangements, during the operation of the engine to respond to the transient requirements such as the increased load state, a first cylinder of the engine may act as a transient cylinder to respond to the increased load condition by decreasing the amount of the first fuel, increasing the amount of the second fuel and increasing the overall fuel rate to generate more power. A second cylinder of the engine may act as a base-load cylinder which operates with a substantially constant ratio of the first fuel to the second fuel, for example in a steady state or adjusting the fuel rate gradually as the air flow or other monitored parameters change.

In some applications, the base-load cylinder may have different operation conditions from the transient cylinder so as to respond slowly to the increased load operation than the transient cylinders. In some examples, a quantity of one of the first fuel, the second fuel, and the oxidant introduced to the first engine cylinder is different from a quantity of one of the first fuel, the second fuel, and the oxidant to the second cylinder based on one or more of the monitored engine parameters. For example, the quantity of the first fuel in the base-load (second) engine cylinder is greater than the quantity of the first fuel in the transient (first) engine cylinder, and the quantity of the second fuel in the base-load engine cylinder is smaller than the quantity of the second fuel in the transient engine cylinder during responding to the increased load operation. As used herein, "one" means one or more. After finishing the increased load operation, the base-load cylinder and the transient cylinder may operate in a similar or an identical steady state mode.

In the transient cylinder, the control unit 21 may control such that the first fuel for introduction therein may be in a range of from about 50% to about 70% of total energy content therein. In one example, the first fuel for introduction may be about 60% of the total energy content therein. In the steady state, the ratio of the first fuel to the second fuel may not vary in the corresponding cylinders, for example may be equal for all of the cylinders of the engine.

Figure 2:
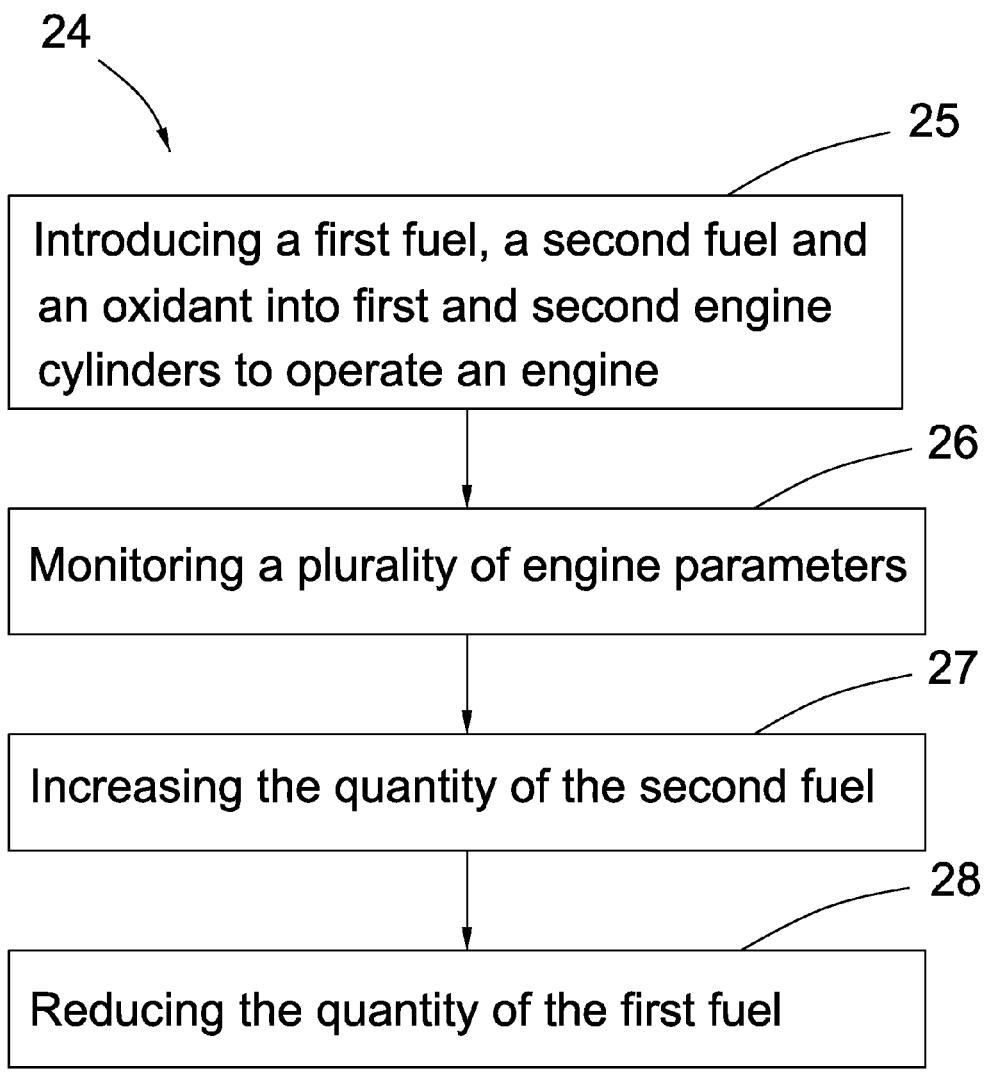
FIG. 2 is a schematic flow chart showing operation of the engine in accordance with one embodiment of the invention.

FIG. 2 is a schematic diagram of the method 24 for introduction of the first and second fuels into a first engine cylinder when the engine operates in the increased load state. It should be noted that the arrangement in FIG. 2 is merely illustrative. As mentioned above, more than one engine cylinder may be employed and the more than one engine cylinder may comprise a transient engine cylinder (a first engine cylinder) and a base-load engine cylinder (a second engine cylinder).

As illustrated in FIG. 2, in step 25, introducing a first fuel, a second fuel and an oxidant into the first engine cylinder to operate an engine. In step 26, monitoring a plurality of engine parameters. As mentioned above, the engine parameters may comprise the engine load and the engine speed.

Subsequently, in step 27, based on one or more of the monitored engine parameters, increasing the quantity of the second fuel to be in a range of from about 30% to about 50% of total energy content for introduction into the first engine cylinder. Meanwhile, in step 28, reducing the quantity of the first fuel to be in a range of from about 50% to about 70% in the first engine cylinder.

In some applications, after the increased load operation of the engine finishes, the engine may be controlled to operate in the previous or another steady state, and the ratio of the first fuel to the second fuel is increased and stable accordingly. In some examples, the sequences of introducing the fuels into the cylinder and monitoring the engine parameters may be the same or different. The sequences of the steps 27 and 28 may also be the same or different.

In embodiments of the invention, the ratio of the first fuel to the second fuel is adjusted in some cylinders in response to the engine operation conditions. For example, in the transient acceleration operation, the quantity of the second fuel is increased and the quantity of the first fuel is reduced so as to avoid detonation or knocking issues generated in the engine. At the same time, the total amount of the fuels (for example, the total quantities of the first fuel and the second fuel) supplied is increased to increase the power level.

In addition, the method for operating the engine in response to the transient acceleration condition is relatively simple to retrofit the conventional engines. In certain applications, the method may be used in response to not only the transient acceleration operation but also other transient operations. Non-limiting examples of the transient operation include the operations switched from respective steady states.

The individual cylinders may further be adapted as needed, based on their purpose. For example, the cylinders that are accepting the transient fueling may be equipped with different compression ratio, different valve lift profiles, different sensors or different hardware configurations than the base load cylinders. In some applications, differences of the hardware configurations between the transient cylinders and the respective base load cylinders may comprise one of a valve event, compression ratio, piston, piston ring, valve lift profile, pressure sensor, temperature sensor, knock sensor, injector or injector nozzle.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

What is claimed is:

1. A method for operating an engine, comprising:
   introducing a first fuel, a second fuel and an oxidant into a first engine cylinder and a second engine cylinder;
   monitoring a plurality of engine parameters; and
   adjusting a quantity of one of the first fuel, the second fuel, and the oxidant introduced to the first engine cylinder to be different from a quantity of one of the first fuel, the second fuel, and the oxidant introduced to the second engine cylinder based on at least one of the plurality of monitored engine parameters, wherein adjusting comprises reducing the quantity of the first fuel and increasing the quantity of the second fuel introduced into the first engine cylinder, further wherein increasing the quantity of the second fuel and reducing the quantity of the first fuel is in response to an increased load operation of the engine.

2. The method of claim 1, wherein the quantity of the first fuel is decreased to be in a range of from about 70% to about 50% of total energy content in the first engine cylinder, wherein the quantity of the second fuel is increased to be in a range of from 30% to about 50% of the total energy content in the first engine cylinder.

3. The method of claim 1, wherein the quantity of the first fuel in the first engine cylinder is smaller than the quantity of the first fuel in the second engine cylinder, and wherein the quantity of the second fuel in the first engine cylinder is greater than the quantity of the second fuel in the second engine cylinder.

4. The method of claim 1, wherein the increased load operation of the engine comprises a transient acceleration operation.

5. The method of claim 1, wherein the first fuel comprises a gaseous fuel and wherein the second fuel comprises a liquid fuel.

6. The method of claim 5, wherein the first fuel comprises natural gas, wherein the second fuel comprises diesel, and wherein the oxidant comprises air.

7. The method of claim 1, wherein the plurality of the engine parameters comprise one of engine load and engine speed.

8. The method of claim 1, wherein introducing comprises introducing a pre-mixture of the first fuel and the oxidant into the first engine cylinder during an intake stroke thereof and introducing the second fuel into the first engine cylinder during a compression stroke thereof.

9. The method of claim 1, wherein the engine comprises an internal combustion engine.

10. The method of claim 1, wherein the first engine cylinder has a first hardware configuration, wherein the second engine cylinder has a second hardware configuration, and wherein the first and second hardware configurations are different.

11. The method of claim 10, wherein the difference of the first and second hardware configurations comprise one of a valve event, compression ratio, piston, piston ring, valve lift profile, pressure sensor, temperature sensor, knock sensor, injector and injector nozzle.

12. A method for operating an engine, comprising:
    introducing a first fuel, a second fuel and an oxidant into a first engine cylinder;
    introducing a first fuel, a second fuel and an oxidant into a second engine cylinder;
    monitoring a plurality of engine parameters;
    increasing a quantity of the second fuel introduced in the first engine cylinder based on one of the plurality of monitored engine parameters; and
    reducing a quantity of the first fuel introduced in the first engine cylinder based on one of the plurality of monitored engine parameters, in response to an increased load operation of the engine, wherein the quantity of the first fuel in the second engine cylinder is greater than the quantity of the first fuel in the first engine cylinder, and wherein the quantity of the second fuel in the second engine cylinder is smaller than the quantity of the second fuel in the first engine cylinder in response to the increased load operation of the engine.

13. The method of claim 12, wherein the increased load operation of the engine comprises a transient acceleration operation.

14. The method of claim 12, wherein the quantity of the first fuel is decreased to be in a range of from about 70% to about 50% of total energy content in the first engine cylinder, and wherein the quantity of the second fuel is increased to be in a range of from 30% to about 50% of the total energy content in the first engine cylinder.

15. The method of claim 12, further comprising adjusting a quantity of one of the first fuel, the second fuel and the oxidant introduced to the second engine cylinder to be different from a quantity of one of the first fuel, the second fuel, and the oxidant introduced to the first engine cylinder.

16. The method of claim 12, wherein introducing comprises introducing a pre-mixture of the first fuel and the oxidant into the first engine cylinder during an intake stroke thereof and introducing the second fuel into the first engine cylinder during a compression stroke thereof.

17. The method of claim 12, wherein the first fuel comprises a gaseous fuel and wherein the second fuel comprises a liquid fuel.

18. The method of claim 12, wherein the first fuel comprises natural gas, wherein the second fuel comprises diesel, and wherein the oxidant comprises air.

19. The method of claim 12, wherein the engine comprises an internal combustion engine.

20. A method for operating an engine, comprising:
    introducing a first fuel, a second fuel and an oxidant into first and second engine cylinders;
    monitoring a plurality of engine parameters;
    increasing a quantity of the second fuel and reducing a quantity of the first fuel in the first engine cylinder in response to an increased load operation of the engine; and
    adjusting a quantity of one of the first fuel, the second fuel and the oxidant introduced to the second engine cylinder to be different from a quantity of one of the first fuel, the second fuel, and the oxidant introduced to the first engine cylinder, wherein the increased load operation of the engine comprises a transient acceleration operation, further wherein the quantity of the first fuel in the second engine cylinder is greater the quantity of the first fuel in the first engine cylinder, and wherein the quantity of the second fuel in the second engine cylinder is smaller than the quantity of the second fuel in the first engine cylinder in response to the increased load operation of the engine.

21. The method of claim 20, wherein the quantity of the second fuel is increased to be in a range of from 30% to about 50% of total energy content in the first engine cylinder, and wherein the quantity of the first fuel is decreased to be in a range of from about 70% to about 50% of total energy content in the first engine cylinder.

22. The method of claim 20, wherein introducing comprises introducing a pre-mixture of the first fuel and the oxidant into the first engine cylinder during an intake stroke thereof and introducing the second fuel into the first engine cylinder during a compression stroke thereof, and wherein the pre-mixture is lean.

23. The method of claim 20, wherein the first fuel comprises a gaseous fuel and wherein the second fuel comprises a liquid fuel.

24. The method of claim 20, wherein the first fuel comprises natural gas, wherein the second fuel comprises diesel, and wherein the oxidant comprises air.

25. The method of claim 20, wherein the engine comprises an internal combustion engine.

26. A method for operating an engine, comprising:
introducing a first fuel, a second fuel and an oxidant into a first engine cylinder and a second engine cylinder;
monitoring a plurality of engine parameters; and
adjusting a quantity of one of the first fuel, the second fuel, and the oxidant introduced to the first engine cylinder to be different from a quantity of one of the first fuel, the second fuel, and the oxidant introduced to the second engine cylinder based on at least one of the plurality of monitored engine parameters, wherein adjusting comprises reducing the quantity of the first fuel and increasing the quantity of the second fuel introduced into the first engine cylinder, wherein the quantity of the first fuel is decreased to be in a range of from about 70% to about 50% of total energy content in the first engine cylinder, wherein the quantity of the second fuel is increased to be in a range of from 30% to about 50% of the total energy content in the first engine cylinder.

27. A method for operating an engine, comprising:
introducing a first fuel, a second fuel and an oxidant into a first engine cylinder;
monitoring a plurality of engine parameters;
increasing a quantity of the second fuel introduced in the first engine cylinder based on one of the plurality of monitored engine parameters; and
reducing a quantity of the first fuel introduced in the first engine cylinder based on one of the plurality of monitored engine parameters, in response to an increased load operation of the engine, wherein the quantity of the first fuel is decreased to be in a range of from about 70% to about 50% of total energy content in the first engine cylinder, and wherein the quantity of the second fuel is increased to be in a range of from 30% to about 50% of the total energy content in the first engine cylinder.

28. A method for operating an engine, comprising:
introducing a first fuel, a second fuel and an oxidant into first and second engine cylinders;
monitoring a plurality of engine parameters;
increasing a quantity of the second fuel and reducing a quantity of the first fuel in the first engine cylinder in response to an increased load operation of the engine; and
adjusting a quantity of one of the first fuel, the second fuel and the oxidant introduced to the second engine cylinder to be different from a quantity of one of the first fuel, the second fuel, and the oxidant introduced to the first engine cylinder, wherein the increased load operation of the engine comprises a transient acceleration operation, wherein the quantity of the second fuel is increased to be in a range of from 30% to about 50% of total energy content in the first engine cylinder, and wherein the quantity of the first fuel is decreased to be in a range of from about 70% to about 50% of total energy content in the first engine cylinder.

29. A method for operating an engine, comprising:
introducing a first fuel, a second fuel and an oxidant into first and second engine cylinders;
monitoring a plurality of engine parameters;
increasing a quantity of the second fuel and reducing a quantity of the first fuel in the first engine cylinder in response to an increased load operation of the engine; and
adjusting a quantity of one of the first fuel, the second fuel and the oxidant introduced to the second engine cylinder to be different from a quantity of one of the first fuel, the second fuel, and the oxidant introduced to the first engine cylinder, wherein the increased load operation of the engine comprises a transient acceleration operation, wherein introducing comprises introducing a pre-mixture of the first fuel and the oxidant into the first engine cylinder during an intake stroke thereof and introducing the second fuel into the first engine cylinder during a compression stroke thereof, and wherein the pre-mixture is lean.

* * * * *